(12) United States Patent
Yao et al.

(10) Patent No.: US 7,701,675 B2
(45) Date of Patent: Apr. 20, 2010

(54) MICRO-ACTUATOR MOUNTING STRUCTURE CAPABLE OF MAINTAINING A SUBSTANTIALLY CONSTANT GAP BETWEEN A TOP SUPPORT OF A MICRO-ACTUATOR AND A SUSPENSION DURING USE

(75) Inventors: MingGao Yao, DongGuan (CN); Yiru Xie, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 968 days.

(21) Appl. No.: 11/304,623

(22) Filed: Dec. 16, 2005

(65) Prior Publication Data

US 2007/0139825 A1    Jun. 21, 2007

(51) Int. Cl.
*G11B 5/56* (2006.01)
(52) U.S. Cl. .................................. 360/294.3; 360/245.3
(58) Field of Classification Search ... 360/294.3–294.5, 360/245.3
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,708,389 B1 | 3/2004 | Carlson et al. | |
| 6,873,497 B2 * | 3/2005 | Yao et al. | 360/294.4 |
| 6,950,266 B1 | 9/2005 | McCaslin et al. | |
| 6,950,288 B2 * | 9/2005 | Yao et al. | 360/294.4 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2004/0037009 A1 * | 2/2004 | Yao et al. | 360/294.4 |
| 2006/0023338 A1 | 2/2006 | Sharma et al. | |

(Continued)

FOREIGN PATENT DOCUMENTS

CN    1632865    6/2005

(Continued)

OTHER PUBLICATIONS

U.S. Appl. No. 11/238,998, filed Sep. 2005, Yang et al.

(Continued)

*Primary Examiner*—A. J. Heinz
(74) *Attorney, Agent, or Firm*—Nixon & Vanderhye P.C.

(57) ABSTRACT

A micro-actuator frame for a head gimbal assembly includes a bottom support adapted to be connected to a suspension of the head gimbal assembly, a top support adapted to support a slider of the head gimbal assembly, a pair of side arms that interconnect the bottom support and the top support, and a micro-actuator mounting structure provided to the bottom support. The micro-actuator mounting structure is constructed and arranged to maintain a substantially constant gap between the top support and the suspension of the head gimbal assembly in use.

35 Claims, 14 Drawing Sheets

U.S. PATENT DOCUMENTS

| | | | |
|---|---|---|---|
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |
| 2007/0076327 A1* | 4/2007 | Yang et al. | 360/294.4 |

FOREIGN PATENT DOCUMENTS

| | | |
|---|---|---|
| JP | 2002-74871 | 3/2002 |
| JP | 2002-133803 | 5/2002 |
| WO | WO 2005/038781 | 4/2005 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

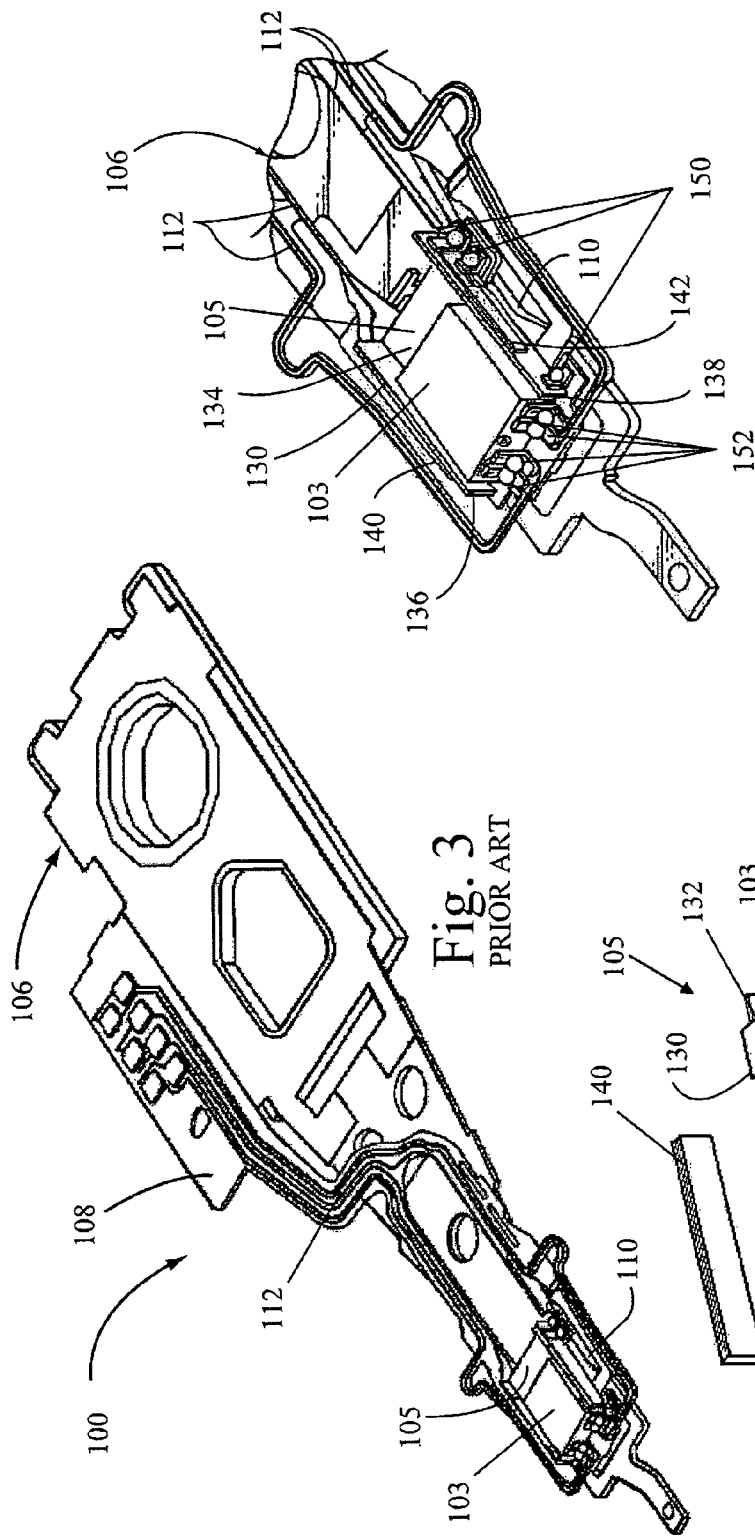

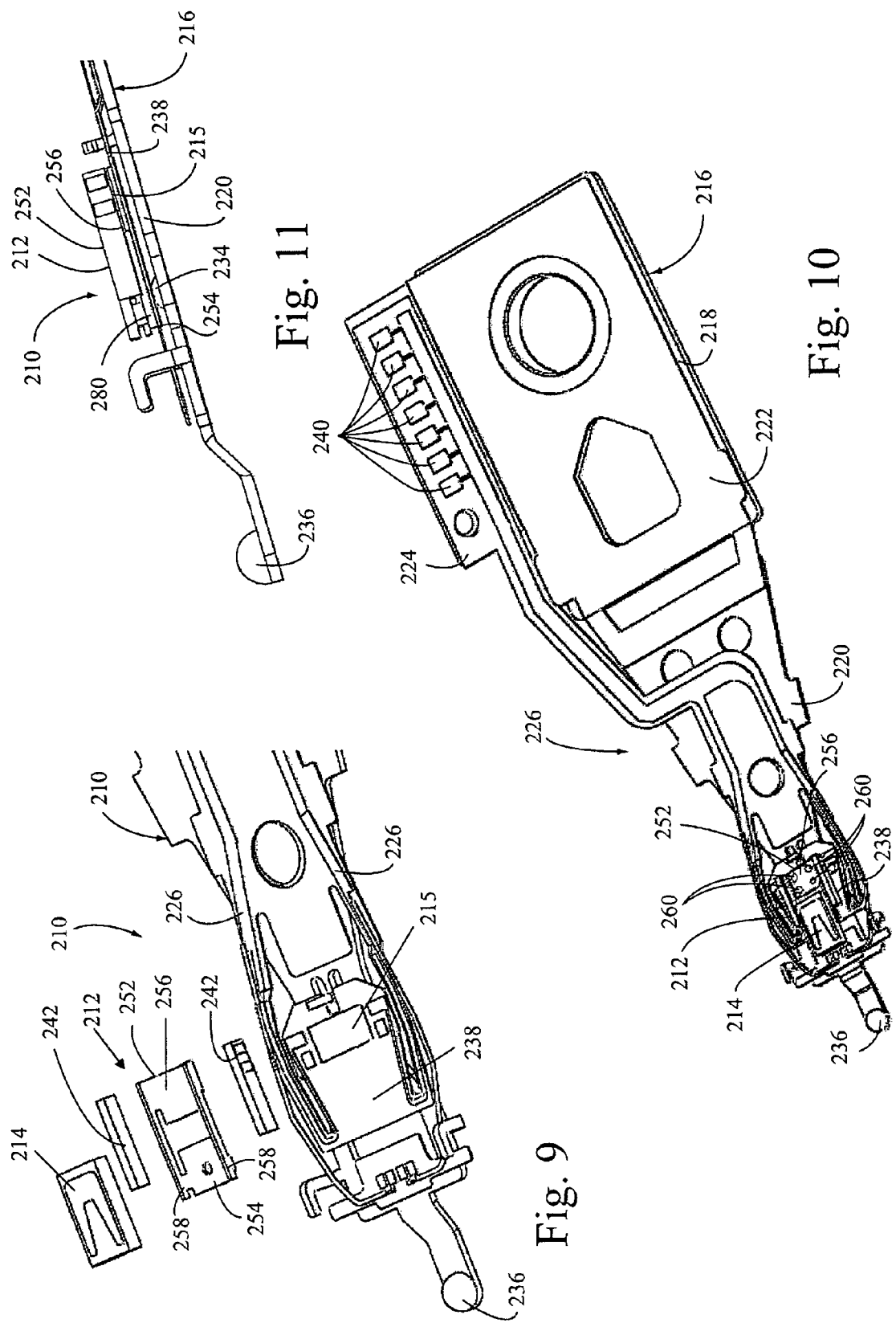

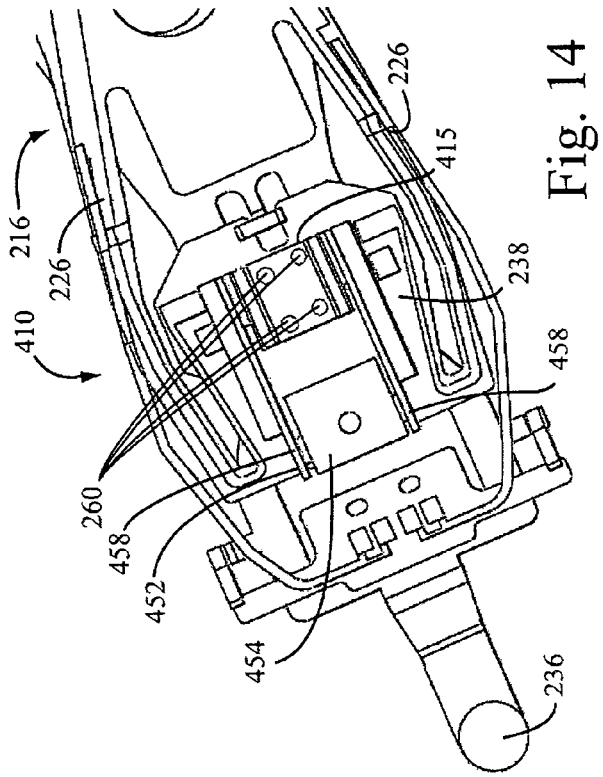
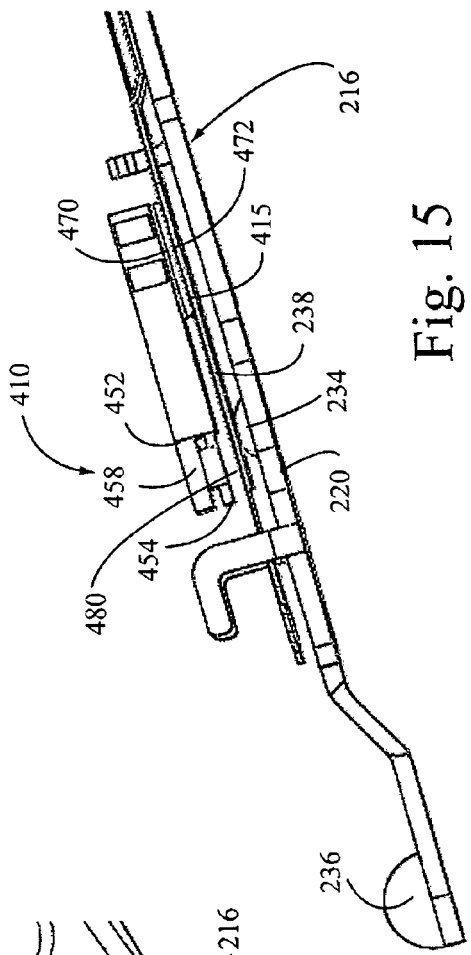
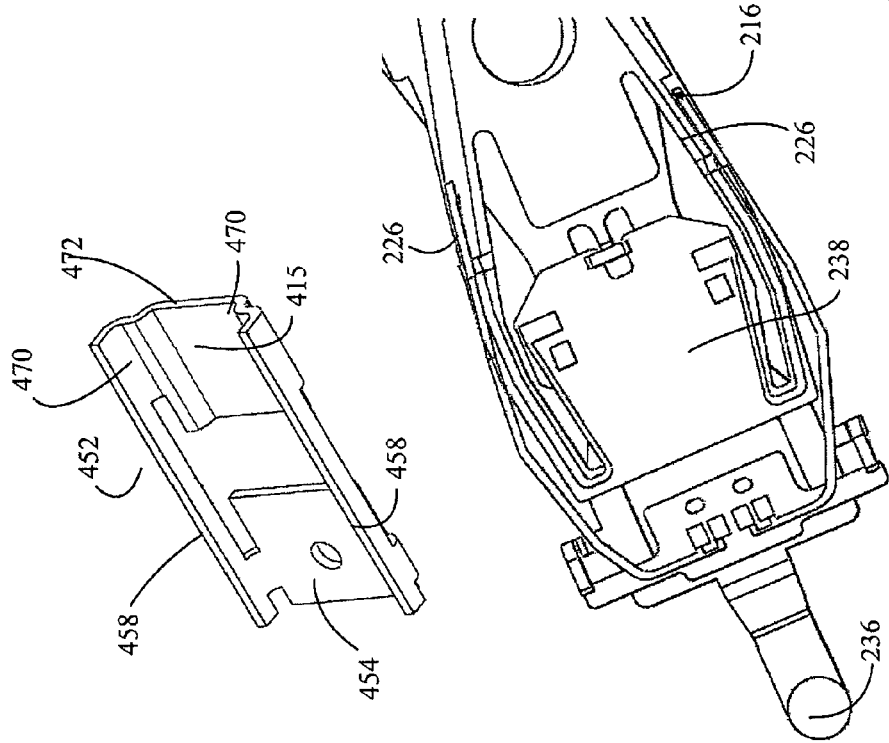
Fig. 14
Fig. 15
Fig. 13

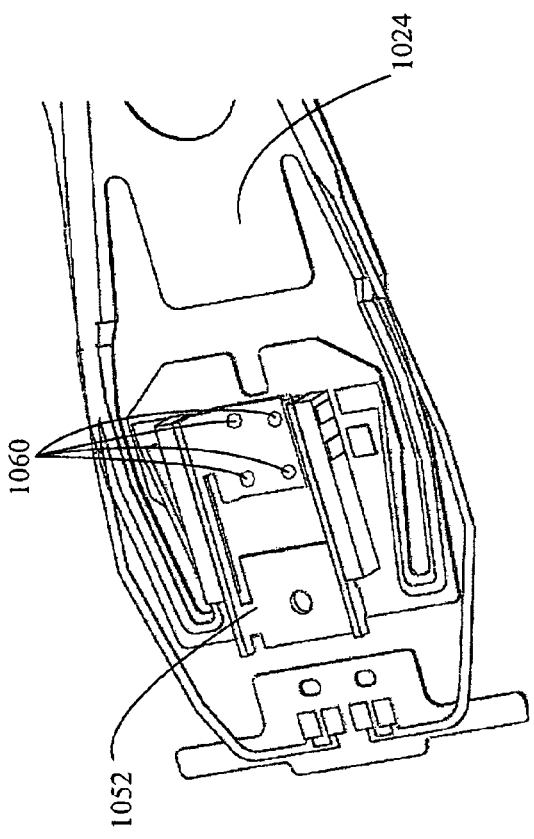
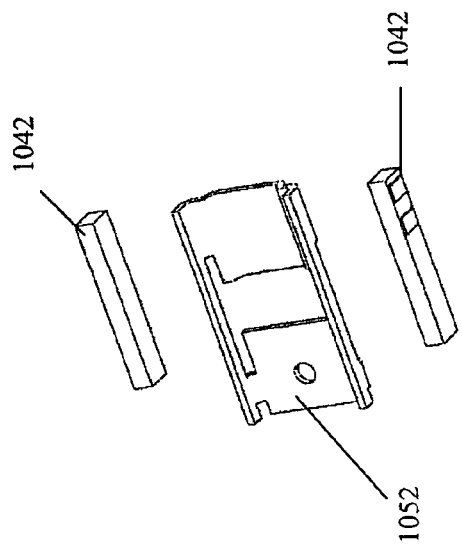
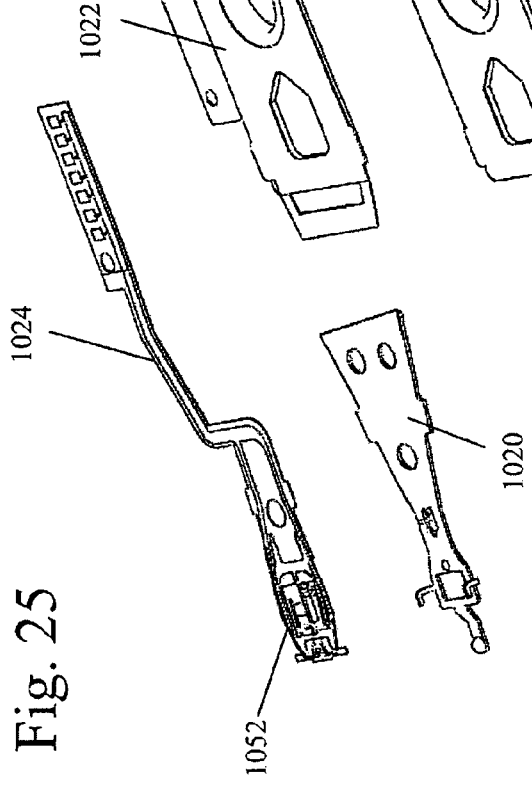
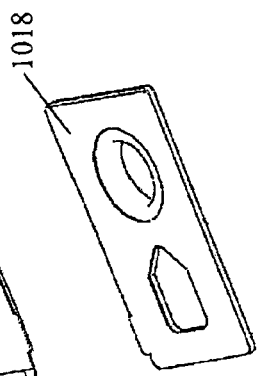
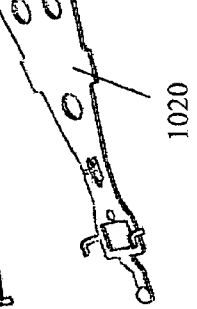
Fig. 25
Fig. 26
Fig. 24

U.S. Pat. No. 7,701,675 B2

MICRO-ACTUATOR MOUNTING STRUCTURE CAPABLE OF MAINTAINING A SUBSTANTIALLY CONSTANT GAP BETWEEN A TOP SUPPORT OF A MICRO-ACTUATOR AND A SUSPENSION DURING USE

FIELD OF THE INVENTION

The present invention relates to information recording disk drive devices and, more particularly, to a micro-actuator for a head gimbal assembly (HGA) of the disk drive device. More specifically, the present invention is directed to a micro-actuator mounting structure that is structured to prevent, or at lease reduce, micro-actuator frame tilt.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive device that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIGS. 1 and 2 illustrate a conventional disk drive device and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 3 illustrates the head gimbal assembly (HGA) 100 of the conventional disk drive device of FIGS. 1-2 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive device, as well as provide an advantageous reduction in the head seeking and settling time. Thus, the PZT micro-actuator 105 enables the disk drive device to have a significant increase in the surface recording density of the information storage disks used therein.

As shown in FIG. 3, the HGA 100 includes a suspension 106 having a flexure 108. The flexure 108 provides a suspension tongue 110 to load the PZT micro-actuator 105 and the slider 103. Suspension traces 112 are provided to the flexure 108 and extend on opposite sides of the suspension tongue 110. The suspension traces 112 electrically couple the PZT micro-actuator 105 and the slider 103 with a control system.

Referring to FIG. 4, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIG. 5, the PZT micro-actuator 105 is physically coupled to the suspension tongue 110 by the bottom support 134 of the frame 130. The bottom support 134 may be mounted on the suspension tongue 110 by epoxy. Three electrical connection balls 150 (gold ball bonding or solder ball bonding, GBB or SBB) are provided to couple the PZT micro-actuator 105 to the suspension traces 112 located at the side of each PZT element 140, 142. In addition, there are four metal balls 152 (GBB or SBB) for coupling the slider 103 to the traces 112 for electrical connection of the read/write transducers. When power is supplied through the suspension traces 112, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement of the slider 103 connected thereto, thereby making the slider 103 move on the track of the disk in order to fine tune the position of the read/write head. In this manner, controlled displacement of slider 103 can be achieved for fine positional tuning.

Referring to FIG. 6, the load beam 160 of the suspension 106 has a dimple 162 formed thereon that engages the suspension tongue 110. A parallel gap 170 is provided between the suspension tongue 110 and the bottom surface of the top support 132 of the micro-actuator frame 130 to allow the PZT micro-actuator 105 and slider 103 to move smoothly and freely in use. The gap 170 is important for micro-actuator operation and HGA performance.

In prior designs, the micro-actuator frame 130 is mounted to the suspension tongue 110 by UV epoxy. Since epoxy is a soft and fluid material, when the environment condition changes, e.g., temperature increase or humidity change, the epoxy may cause the micro-actuator frame 130 to creep or tilt when the slider is flying on the disk with an air flow pressure. For example, FIG. 7 illustrates the gap 170 being reduced when the frame 130 tilts towards the suspension tongue 110, and FIG. 8 illustrates the gap 170 being increased when the frame 130 tilts away from the suspension tongue 110. A general case scenario is that the head static angle may change (as illustrated in FIGS. 7 and 8), and a worst case scenario is that the frame tilt may cause engagement between the frame and the suspension. Both of these scenarios may cause slider read/write errors, cause damage to the head/disk system, and/or cause the micro-actuator to not work.

Thus, there is a need for an improved micro-actuator mounting system and method that does not suffer from the above-mentioned drawbacks.

SUMMARY OF THE INVENTION

One aspect of the present invention relates to a micro-actuator mounting structure that is structured to prevent, or at least reduce, micro-actuator frame tilt.

Another aspect of the invention relates to a micro-actuator frame for a head gimbal assembly. The micro-actuator frame includes a bottom support adapted to be connected to a suspension of the head gimbal assembly, a top support adapted to support a slider of the head gimbal assembly, a pair of side arms that interconnect the bottom support and the top support, and a micro-actuator mounting structure provided to the bottom support. The micro-actuator mounting structure is constructed and arranged to maintain a substantially constant gap between the top support and the suspension of the head gimbal assembly in use.

Another aspect of the invention relates to a micro-actuator frame for a head gimbal assembly. The micro-actuator frame includes a bottom support adapted to be connected to a suspension of the head gimbal assembly, a top support adapted to support a slider of the head gimbal assembly, and a pair of side arms that interconnect the bottom support and the top support. One of the bottom support and the top support is separated into two parts that forms a gap therebetween.

Another aspect of the invention relates to a suspension for a head gimbal assembly. The suspension includes a suspension flexure and a micro-actuator mounting structure provided to the suspension flexure and adapted to support a micro-actuator frame. The micro-actuator mounting structure is constructed and arranged to maintain a substantially constant gap between a top support of the micro-actuator frame and the suspension flexure in use.

Another aspect of the invention relates to a head gimbal assembly including a suspension, a micro-actuator mounted to the suspension by laser welding, and a micro-actuator mounting structure provided to one of the suspension and the micro-actuator. The micro-actuator mounting structure extends between the micro-actuator and the suspension to support the micro-actuator on the suspension. The micro-actuator mounting structure is constructed and arranged to maintain a substantially constant gap between a top support of the micro-actuator and the suspension in use.

Yet another aspect of the invention relates to a disk drive device including a head gimbal assembly, a drive arm connected to the head gimbal assembly, a disk, and a spindle motor operable to spin the disk. The head gimbal assembly includes a suspension, a micro-actuator mounted to the suspension by laser welding, and a micro-actuator mounting structure provided to one of the suspension and the micro-actuator. The micro-actuator mounting structure extends between the micro-actuator and the suspension to support the micro-actuator on the suspension. The micro-actuator mounting structure is constructed and arranged to maintain a substantially constant gap between a top support of the micro-actuator and the suspension in use.

Still another aspect of the invention relates to a method for manufacturing a head gimbal assembly. The method includes providing a micro-actuator frame, mounting a PZT element to the micro-actuator frame, laser welding the micro-actuator frame to a suspension, electrically connecting the PZT element to suspension traces provided on the suspension, mounting a slider to the micro-actuator frame, electrically connecting the slider to suspension traces provided on the suspension, performing a visual inspection, testing slider and PZT performance, and cleaning.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a perspective view of a conventional head gimbal assembly (HGA);

FIG. 4 is a perspective view of a slider and PZT micro-actuator of the HGA shown in FIG. 3;

FIG. 5 is a partial perspective view of the HGA shown in FIG. 3;

FIG. 9 is an exploded perspective view of a head gimbal assembly (HGA) including a micro-actuator mounting structure according to an embodiment of the present invention;

FIG. 10 is a top perspective view of the HGA shown in FIG. 9 in an assembled state;

FIG. 11 is a side view of the HGA shown in FIG. 9 in an assembled state;

FIG. 13 is an exploded perspective view of a head gimbal assembly (HGA) including a micro-actuator mounting structure according to another embodiment of the present invention;

FIG. 14 is a top perspective view of the HGA shown in FIG. 13 in an assembled state;

FIG. 15 is a side view of the HGA shown in FIG. 13 in an assembled state;

FIGS. 24-26 are sequential views illustrating a manufacturing process according to another embodiment of the present invention.

DETAILED DESCRIPTION OF ILLUSTRATED EMBODIMENTS

Figure 1:
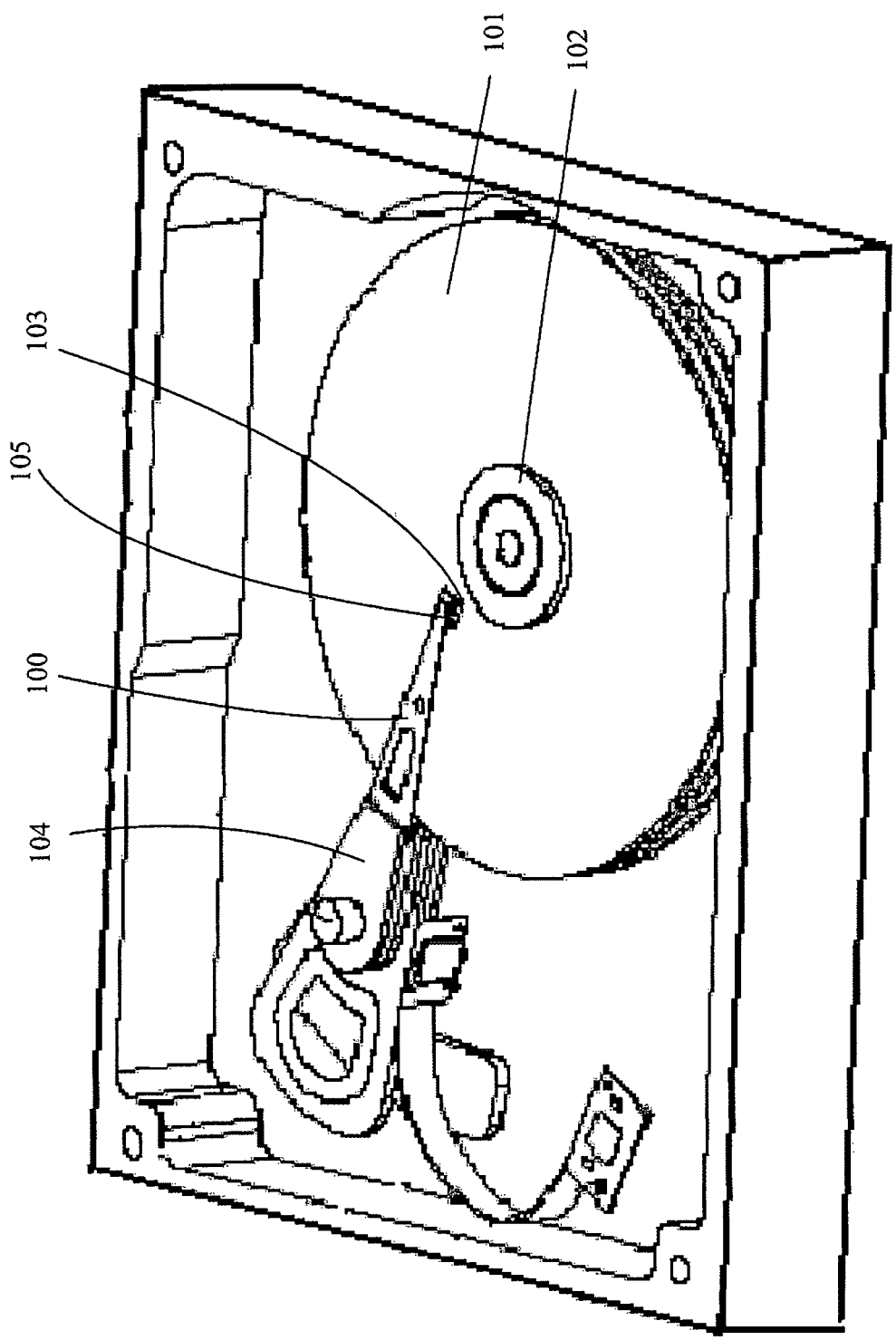
FIG. 1 is a perspective view of a conventional disk drive device.
Figure 2:
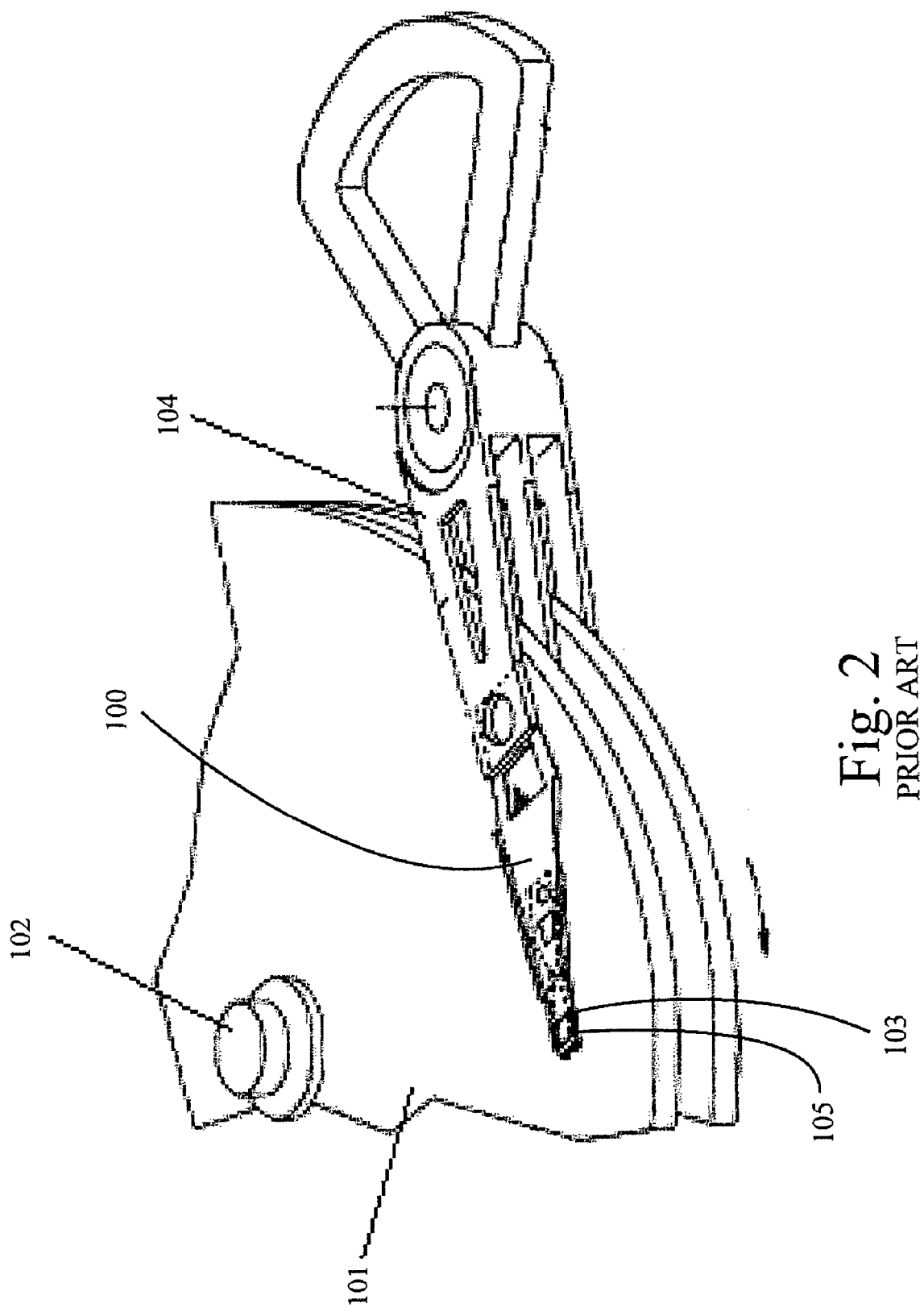
FIG. 2 is a partial perspective view of the conventional disk drive device shown in FIG. 1.
Figure 7:
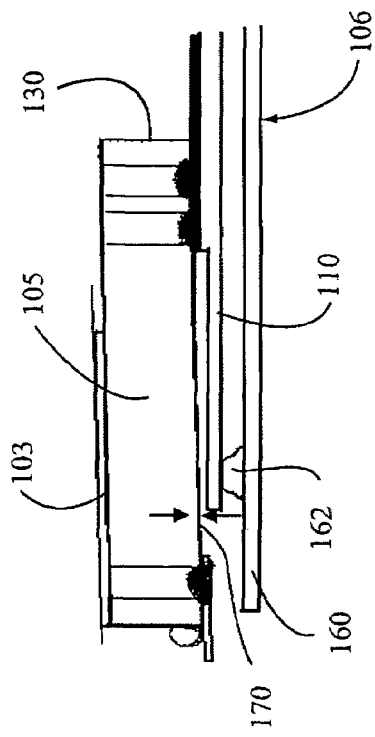
FIG. 7 is a side view of the HGA shown in FIG. 3 illustrating frame tilt which reduces the gap between the micro-actuator and suspension.
Figure 6:
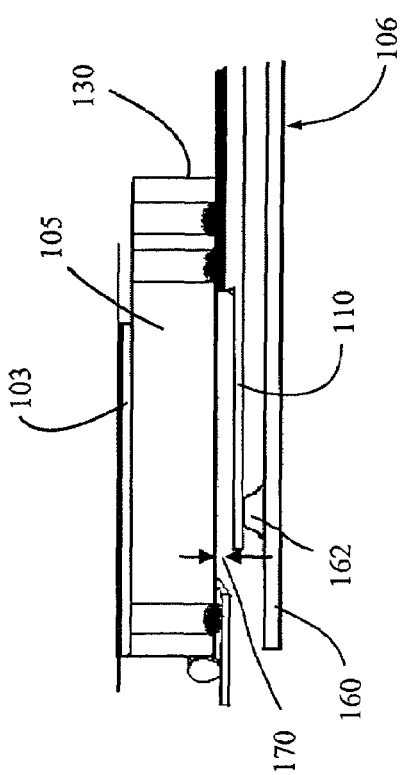
FIG. 6 is a side view of the HGA shown in FIG. 3.
Figure 8:
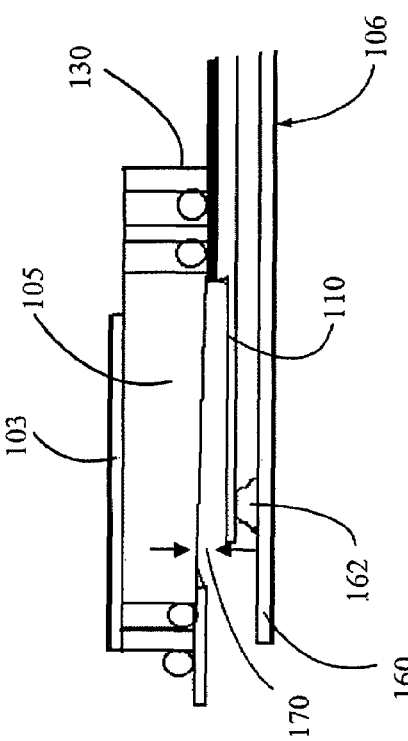
FIG. 8 is a side view of the HGA shown in FIG. 3 illustrating frame tilt which increases the gap between the micro-actuator and suspension.

Various preferred embodiments of the instant invention will now be described with reference to the figures, wherein like reference numerals designate similar parts throughout the various views. As indicated above, the instant invention is designed to prevent, or at least reduce, micro-actuator frame tilt in a head gimbal assembly (HGA) while precisely actuating the slider using the micro-actuator. An aspect of the instant invention is to provide a micro-actuator mounting structure that is structured to prevent, or at least reduce, micro-actuator frame tilt in the HGA. By reducing the micro-actuator frame tilt in the HGA, the performance characteristics of the device are improved.

Several example embodiments of a micro-actuator mounting structure for a HGA will now be described. It is noted that the micro-actuator mounting structure may be implemented in any suitable disk drive device having a micro-actuator in which it is desired to prevent, or at least reduce, micro-actuator frame tilt, regardless of the specific structure of the HGA as illustrated in the figures. That is, the invention may be used in any suitable device having a micro-actuator in any industry.

FIGS. 9-11 illustrates a head gimbal assembly (HGA) 210 incorporating a micro-actuator mounting structure 215 according to an exemplary embodiment of the present invention. The HGA 210 includes a PZT micro-actuator 212, a slider 214, a suspension 216 to load or suspend the PZT micro-actuator 212 and the slider 214, and a micro-actuator mounting structure 215 that mounts the PZT micro-actuator 212 on the suspension 216.

As illustrated, the suspension 216 includes a base plate 218, a load beam 220, a hinge 222, a flexure 224, and suspension traces 226 in the flexure 224. The base plate 218 is constructed of a relatively hard or rigid material, e.g., metal, to stably support the suspension 216 on a drive arm of a voice coil motor (VCM) of a disk drive device. The hinge 222 is mounted onto the base plate 218 and load beam 220, e.g., by welding. The load beam 220 is mounted onto the hinge 222, e.g., by welding. The load beam 220 has a dimple 234 formed thereon for engaging the flexure 224 (see FIG. 11). The load beam 220 functions as a spring or shock absorber to buffer the suspension 216 from the slider 214. An optional lift tab 236 may be provided on the load beam 220 to lift the HGA 210 from the disk when the disk is not rotated. The flexure 224 is mounted to the hinge 222 and the load beam 220, e.g., by lamination or welding. The flexure 224 provides a suspension tongue 238 to support the PZT micro-actuator 212 on the suspension 216. The suspension tongue 238 engages the dimple 234 on the load beam 220. Also, the suspension traces 226 are provided on the flexure 224 to electrically connect a plurality of connection pads 240 (which connect to an external control system) with the slider 214 and the PZT elements 242 on the PZT micro-actuator 212. The suspension traces 226 may be a flexible printed circuit (FPC) and may include any suitable number of lines.

FIG. 9 illustrates the PZT micro-actuator 212 and slider 214 removed from the suspension 216. As illustrated, the PZT micro-actuator 212 includes a micro-actuator frame 252 and PZT elements 242 mounted to the micro-actuator frame 252. The micro-actuator frame 252 includes a top support 254, a bottom support 256, and side arms 258 that interconnect the top support 254 and bottom support 256. The side arms each have a PZT element 242 (e.g., laminated thin films consisting of piezoelectric material such as PZT and Ni—Ag or Pt or gold metal as electrode, or a ceramic PZT with a single layer or a multi-layer) attached thereto. The slider 214 is supported on the top support 254. The micro-actuator frame 252 may be constructed of any suitable material, e.g., metal, and may be constructed using any suitable process.

As best shown in FIGS. 10-11, the bottom support 256 is structured to connect the micro-actuator frame 252 to the suspension 216. Specifically, the micro-actuator mounting structure 215, in the form of a support step, is laminated on the suspension tongue 238 of the suspension 216. The bottom support 256 is mounted to the micro-actuator mounting structure 215 by welding, e.g., laser welding, such that the micro-actuator mounting structure 215 is sandwiched between the bottom support 256 and the suspension tongue 238. FIG. 10 illustrates the bottom support 256 of the micro-actuator frame 252 welded on the micro-actuator mounting structure 215 by a plurality of laser dots 260, e.g., four laser dots.

This connects the bottom support 256 to the suspension tongue 238 and provides a parallel gap 280 between the suspension tongue 238 and the bottom surface of the top support 254 of the micro-actuator frame 252 to allow the PZT micro-actuator 212 and slider 214 to move smoothly and freely in use (see FIG. 11).

The micro-actuator mounting structure 215 may be constructed of metal sheet pieces, e.g., stainless steel, cu, etc., or a polyimide laminate layer. This mounting arrangement of the micro-actuator frame 252, i.e., micro-actuator mounting structure 215 and laser welding, maintains the gap 280 between the micro-actuator frame 252 and the suspension tongue 238 in use regardless of environment condition changes, e.g., temperature increase or humidity change. Thus, tiling of the micro-actuator frame 252 with respect to the suspension 216 is substantially prevented when the slider 214 and the PZT micro-actuator 212 is in use, which improves the performance characteristics of the slider 214, PZT micro-actuator 212, and HGA 210.

In use, the PZT elements 242 are excited, e.g., by applying voltage thereto via suspension traces 226, to selectively cause expansion or contraction thereof. The PZT micro-actuator 212 is configured such that expansion or contraction of the PZT elements 242 causes movement of the side arms 258, which causes movement of the top support 254, which, in turn, causes movement of the slider 214 coupled thereto.

Figure 12:
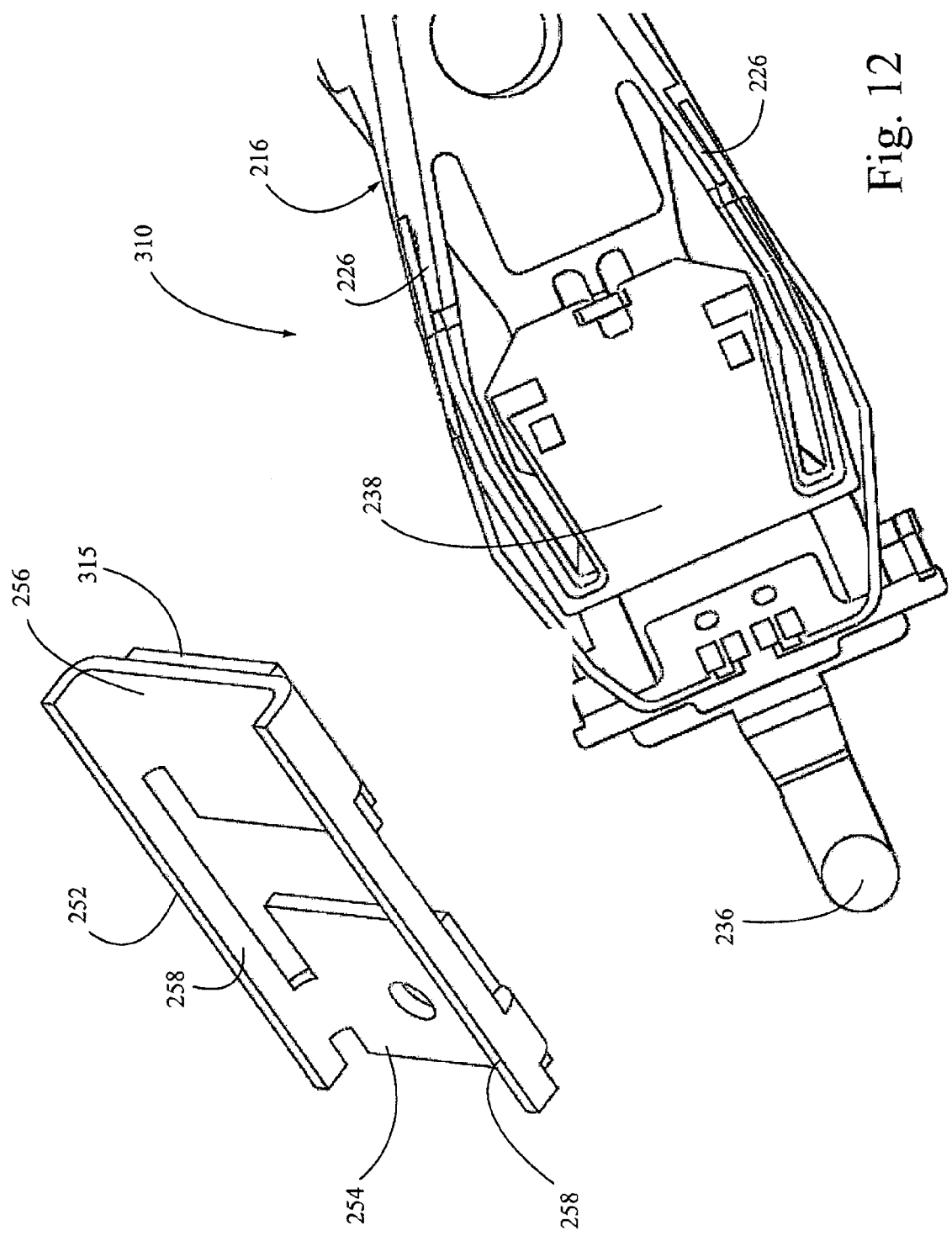
FIG. 12 is an exploded perspective view of a head gimbal assembly (HGA) including a micro-actuator mounting structure according to another embodiment of the present invention.

FIG. 12 illustrates a head gimbal assembly (HGA) 310 incorporating a micro-actuator mounting structure 315 according to another exemplary embodiment of the present invention. In this embodiment, the micro-actuator mounting structure 315, in the form of a support step, is provided on the bottom support 256 of the micro-actuator frame 252. Specifically, the micro-actuator mounting structure 315, e.g., metal sheet pieces or a polyimide laminate layer, is laminated or welded to the bottom surface of the bottom support 256. Then, the bottom support 256 including the micro-actuator mounting structure 315 is mounted to the suspension tongue 238 of the suspension 216 by welding, e.g., laser welding, such that the micro-actuator mounting structure 315 is sandwiched between the bottom support 256 and the suspension tongue 238. The remaining components of the HGA 310 are substantially similar to the HGA 210 and indicated with similar reference numerals.

Similar to the above, this mounting arrangement of the micro-actuator frame 252, i.e., micro-actuator mounting structure 315 and laser welding, maintains a gap between the micro-actuator frame 252 and the suspension tongue 238 in use.

FIGS. 13-15 illustrate a head gimbal assembly (HGA) 410 incorporating a micro-actuator mounting structure 415 according to another exemplary embodiment of the present invention. In this embodiment, the micro-actuator mounting structure 415 is integrated into the micro-actuator frame 452. Specifically, as shown in FIG. 13, the micro-actuator frame 452 includes a top support 454, a micro-actuator mounting structure 415 that constitutes the bottom support, and side arms 458 that interconnect the top support 454 and the micro-actuator mounting structure 415. As illustrated, the micro-actuator mounting structure 415 has a stepped configuration, e.g., two step configuration, that provides first and second steps 470, 472. The stepped configuration is formed during manufacture of the micro-actuator frame 452, e.g., by mechanical push or die model.

The micro-actuator mounting structure 415 is mounted to the suspension tongue 238 of the suspension 216 by welding, e.g., laser welding, such that the micro-actuator mounting structure 415 supports the micro-actuator frame 452 on the suspension tongue 238. FIG. 14 illustrates the micro-actuator mounting structure 415 welded on the suspension tongue 238 by a plurality of laser dots 260, e.g., four laser dots. The remaining components of the HGA 410 are substantially similar to the HGA 210 and indicated with similar reference numerals.

Similar to the above, this mounting arrangement of the micro-actuator frame 452, i.e., micro-actuator mounting structure 415 and laser welding, maintains a gap 480 between the micro-actuator frame 452 and the suspension tongue 238 in use (see FIG. 15).

Figure 17:
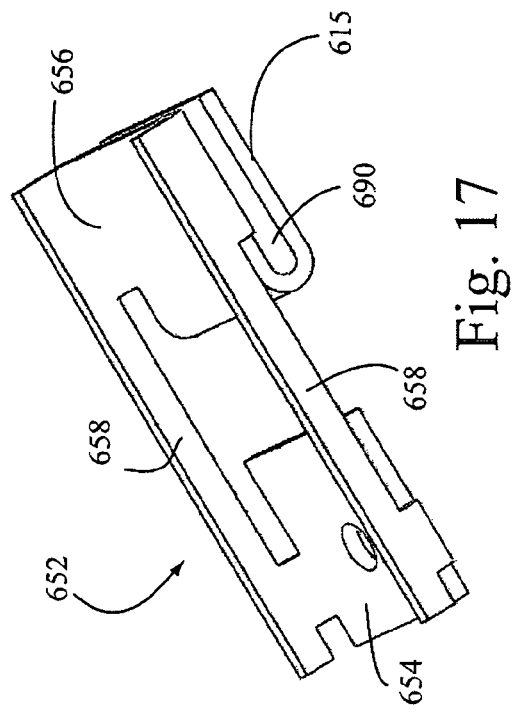
FIG. 17 is a perspective view of a micro-actuator frame including a micro-actuator mounting structure according to another embodiment of the present invention.
Figure 16:
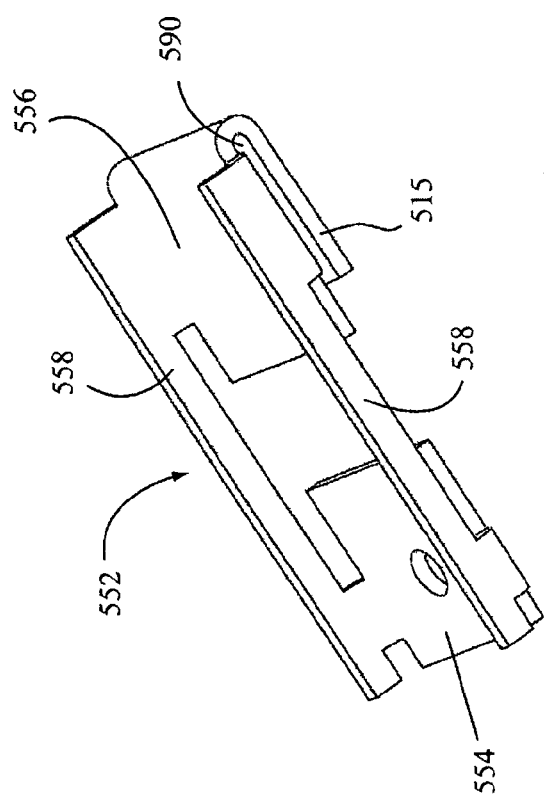
FIG. 16 is a perspective view of a micro-actuator frame including a micro-actuator mounting structure according to another embodiment of the present invention.
Figure 18:
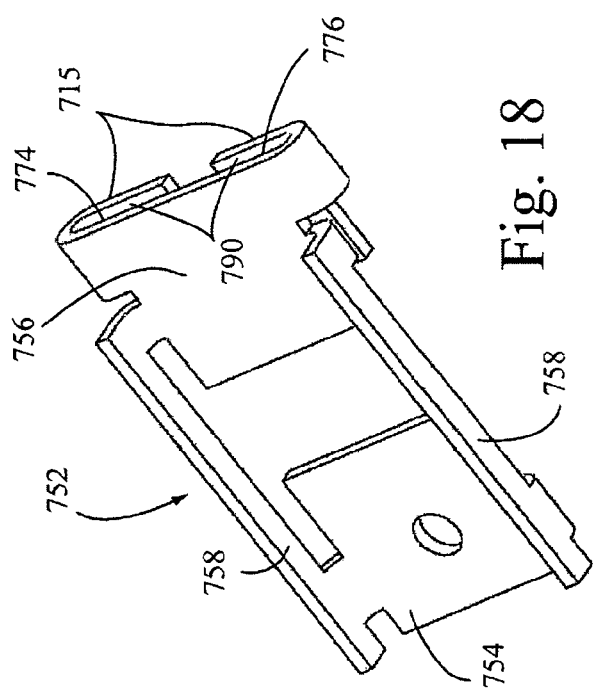
FIG. 18 is a perspective view of a micro-actuator frame including a micro-actuator mounting structure according to another embodiment of the present invention.

FIGS. 16-18 illustrate additional embodiments wherein the micro-actuator mounting structure is integrated into the micro-actuator frame. For example, FIG. 16 illustrates a micro-actuator frame 552 including a top support 554, a bottom support 556, side arms 558 that interconnect the top support 554 and the bottom support 556, and a micro-actuator mounting structure 515 integrated to and extending from the bottom support 556. As illustrated, the micro-actuator mounting structure 515 is bent from an outer end of the bottom support 556 towards the bottom surface of the bottom support 556. Thus, the micro-actuator mounting structure 515 extends generally parallel with the bottom support 556, and a parallel gap 590 is formed between the micro-actuator mounting structure 515 and the bottom support 556. The bent configuration is formed during manufacture of the micro-actuator frame 552, e.g., by mechanical bending.

When the micro-actuator frame 552 is mounted to the suspension tongue 238 of the suspension 216 by welding, e.g., laser welding, the micro-actuator mounting structure 515 supports the micro-actuator frame 552 on the suspension tongue 238. Similar to the above, this mounting arrangement of the micro-actuator frame 552, i.e., micro-actuator mounting structure 515 and laser welding, maintains a gap between the micro-actuator frame 552 and the suspension tongue 238 in use.

FIG. 17 illustrates a micro-actuator frame 652 including a top support 654, a bottom support 656, side arms 658 that interconnect the top support 654 and the bottom support 656, and a micro-actuator mounting structure 615 integrated to and extending from the bottom support 656. As illustrated, the micro-actuator mounting structure 615 is bent from an inner end of the bottom support 656 towards the bottom surface of the bottom support 656. Thus, the micro-actuator mounting structure 615 extends generally parallel with the bottom support 656, and a parallel gap 690 is formed between the micro-actuator mounting structure 615 and the bottom support 656. The bent configuration is formed during manufacture of the micro-actuator frame 652, e.g., by mechanical bending.

When the micro-actuator frame 652 is mounted to the suspension tongue 238 of the suspension 216 by welding, e.g., laser welding, the micro-actuator mounting structure 615 supports the micro-actuator frame 652 on the suspension tongue 238. Similar to the above, this mounting arrangement of the micro-actuator frame 652, i.e., micro-actuator mounting structure 615 and laser welding, maintains a gap between the micro-actuator frame 652 and the suspension tongue 238 in use.

FIG. 18 illustrates a micro-actuator frame 752 including a top support 754, a bottom support 756, side arms 758 that interconnect the top support 754 and the bottom support 756, and a micro-actuator mounting structure 715 integrated to and extending from the bottom support 756. As illustrated, the micro-actuator mounting structure 715 includes first and second tabs 774, 776 that are bent from opposing sides of the bottom support 756 towards the bottom surface of the bottom support 756. Thus, the tabs 774, 776 extend generally parallel with the bottom support 756, and a parallel gap 790 is formed between each of the tabs 774, 776 and the bottom support 756. The bent configuration is formed during manufacture of the micro-actuator frame 752, e.g., by mechanical bending.

When the micro-actuator frame 752 is mounted to the suspension tongue 238 of the suspension 216 by welding, e.g., laser welding, the tabs 774, 776 of the micro-actuator mounting structure 715 support the micro-actuator frame 752 on the suspension tongue 238. Similar to the above, this mounting arrangement of the micro-actuator frame 752, i.e., micro-actuator mounting structure 715 and laser welding, maintains a gap between the micro-actuator frame 752 and the suspension tongue 238 in use.

Figure 20:
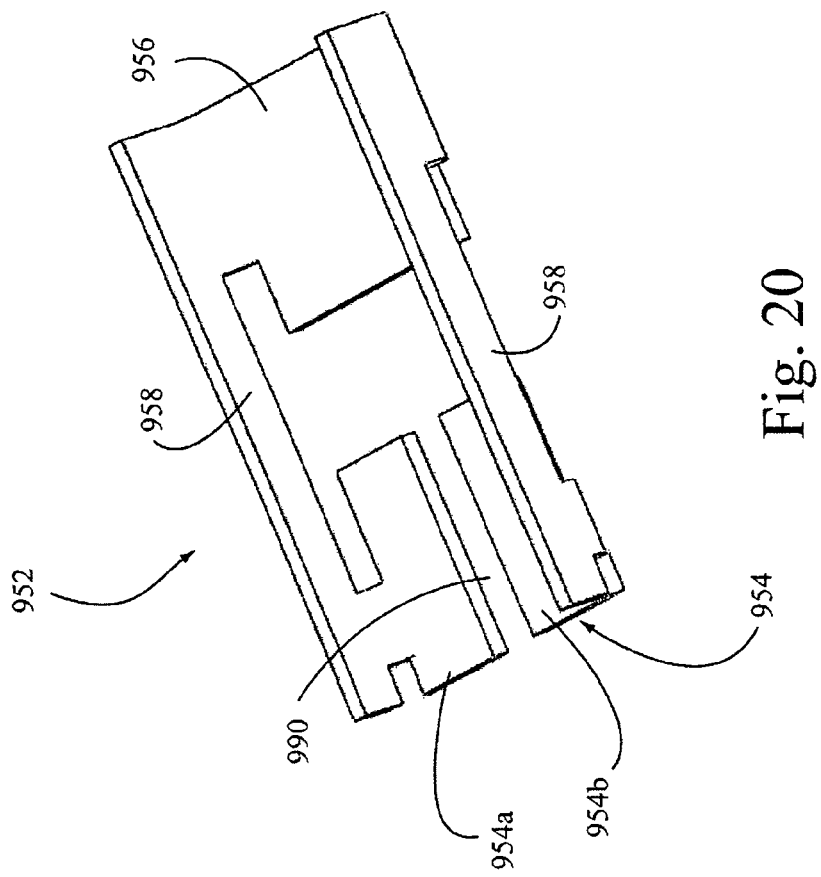
FIG. 20 is a perspective view of a micro-actuator frame according to another embodiment of the present invention.
Figure 19:
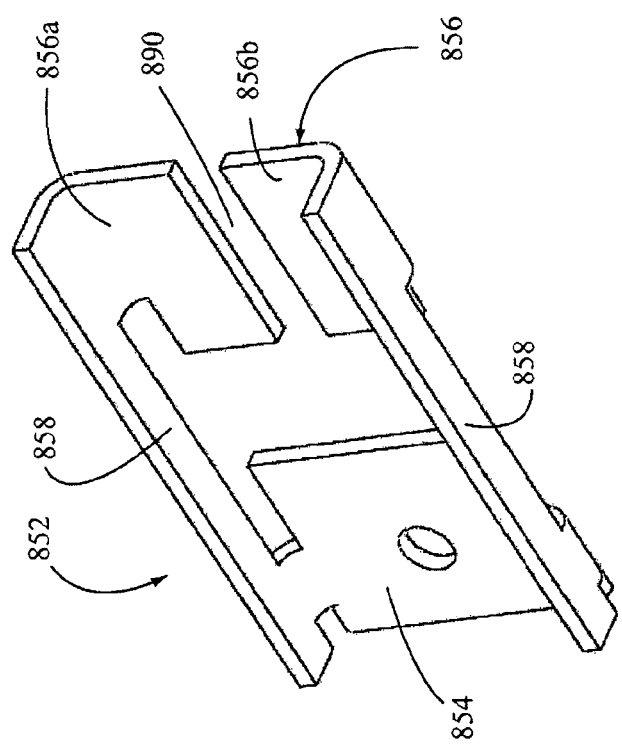
FIG. 19 is a perspective view of a micro-actuator frame according to another embodiment of the present invention.

FIGS. 19 and 20 illustrate additional embodiments of micro-actuator frames. For example, FIG. 19 illustrates a micro-actuator frame 852 including a top support 854, a bottom support 856, and side arms 858 that interconnect the top support 854 and the bottom support 856. As illustrated, the bottom support 856 is separated into parts 856*a* and 856*b*, and a gap 890 is formed between the two parts. This arrangement of the bottom support 856 allows the micro-actuator frame 852 to maintain its form during use. Also, the forming of the micro-actuator frame 852 may provide a parallel gap between the top support 854 and the bottom support 856.

When the micro-actuator frame 852 is mounted to the suspension tongue 238 of the suspension 216 by welding, e.g., laser welding, the bottom support 856 supports the micro-actuator frame 852 on the suspension tongue 238. Similar to the above, this mounting arrangement of the micro-actuator frame 852, i.e., two-part bottom support 856 and laser welding, maintains a gap between the micro-actuator frame 852 and the suspension tongue 238 in use.

FIG. 20 illustrates a micro-actuator frame 952 including a top support 954, a bottom support 956, and side arms 958 that interconnect the top support 954 and the bottom support 956. As illustrated, the top support 954 is separated into parts 954*a* and 954*b*, and a gap 990 is formed between the two parts. This arrangement of the top support 954 allows the micro-actuator frame 952 to maintain its form during use. Also, the forming of the micro-actuator frame 952 may provide a parallel gap between the top support 954 and the bottom support 956.

When the micro-actuator frame 952 is mounted to the suspension tongue 238 of the suspension 216 by welding, e.g., laser welding, the bottom support 956 supports the micro-actuator frame 952 on the suspension tongue 238. Similar to the above, this mounting arrangement of the micro-actuator frame 952, i.e., two-part top support 954 and laser welding, maintains a gap between the micro-actuator frame 952 and the suspension tongue 238 in use.

Figure 21:
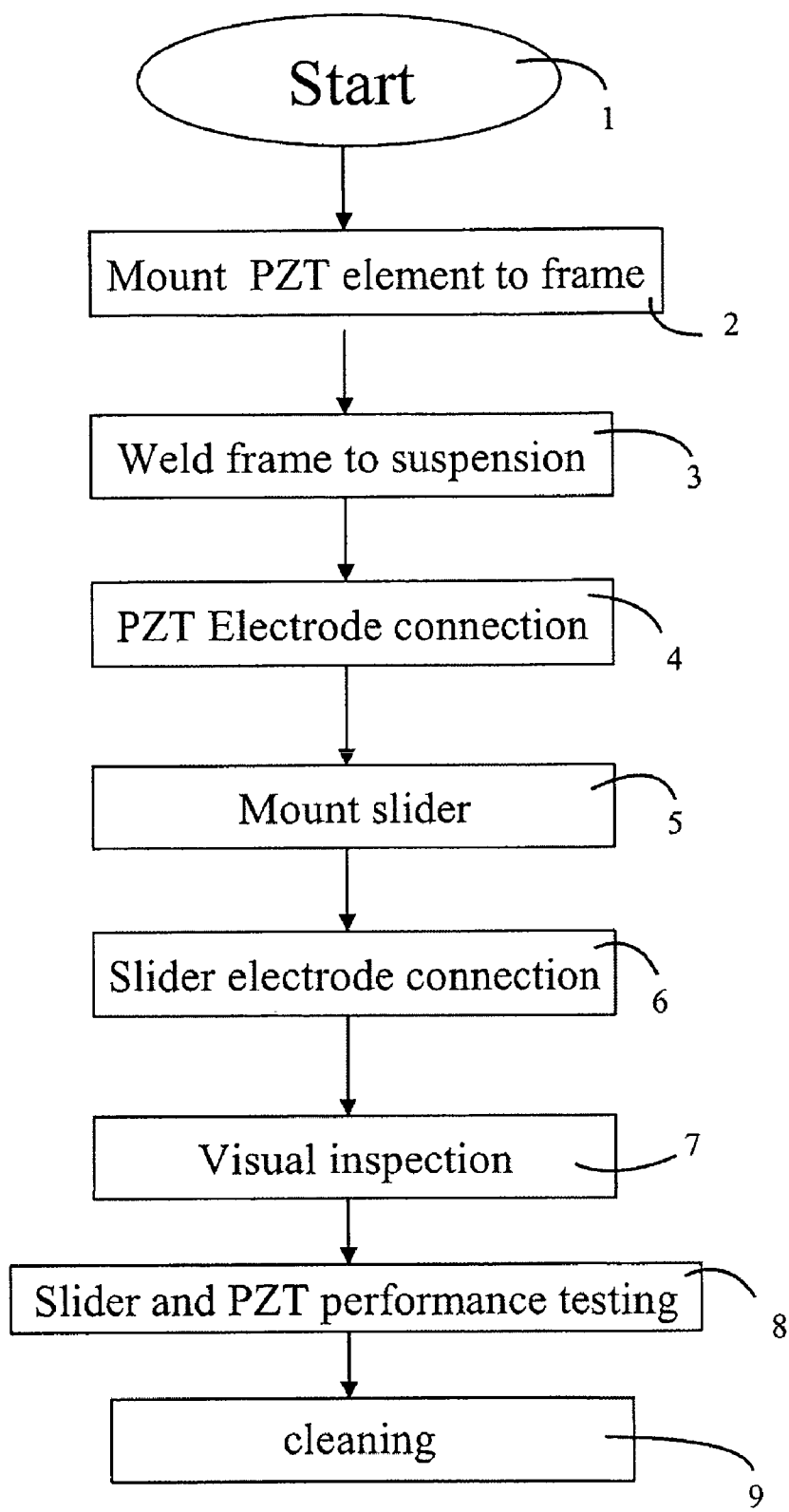
FIG. 21 is a flow chart illustrating a manufacturing process according to another embodiment of the present invention.

FIGS. 21-30 illustrate the primary steps involved in the manufacturing and assembly process of a head gimbal assembly according to embodiments of the present invention. For example, FIG. 21 illustrates a first exemplary embodiment of a manufacturing process of a head gimbal assembly. After the process starts (step 1 of FIG. 21), PZT elements are mounted to side arms of the micro-actuator frame (step 2 of FIG. 21). The micro-actuator frame may be of the type described above in FIGS. 9-20. Then, the micro-actuator frame is welded, e.g., laser welding, to the suspension tongue of the suspension (step 3 of FIG. 21). The micro-actuator frame may be welded via a micro-actuator mounting structure of the type described above in FIGS. 9-20. After the welding, the PZT elements are electrically connected with suspension traces provided on the suspension (step 4 of FIG. 21). Next, the slider is mounted to the micro-actuator frame (step 5 of FIG. 21), and then the slider is electrically connected with suspension traces provided on the suspension (step 6 of FIG. 21). The head gimbal assembly is visually inspected (step 7 of FIG. 21), and slider and PZT performance testing is conducted (step 8 of FIG. 21). In the final step, the head gimbal assembly is cleaned (step 9 of FIG. 21).

Figure 22:
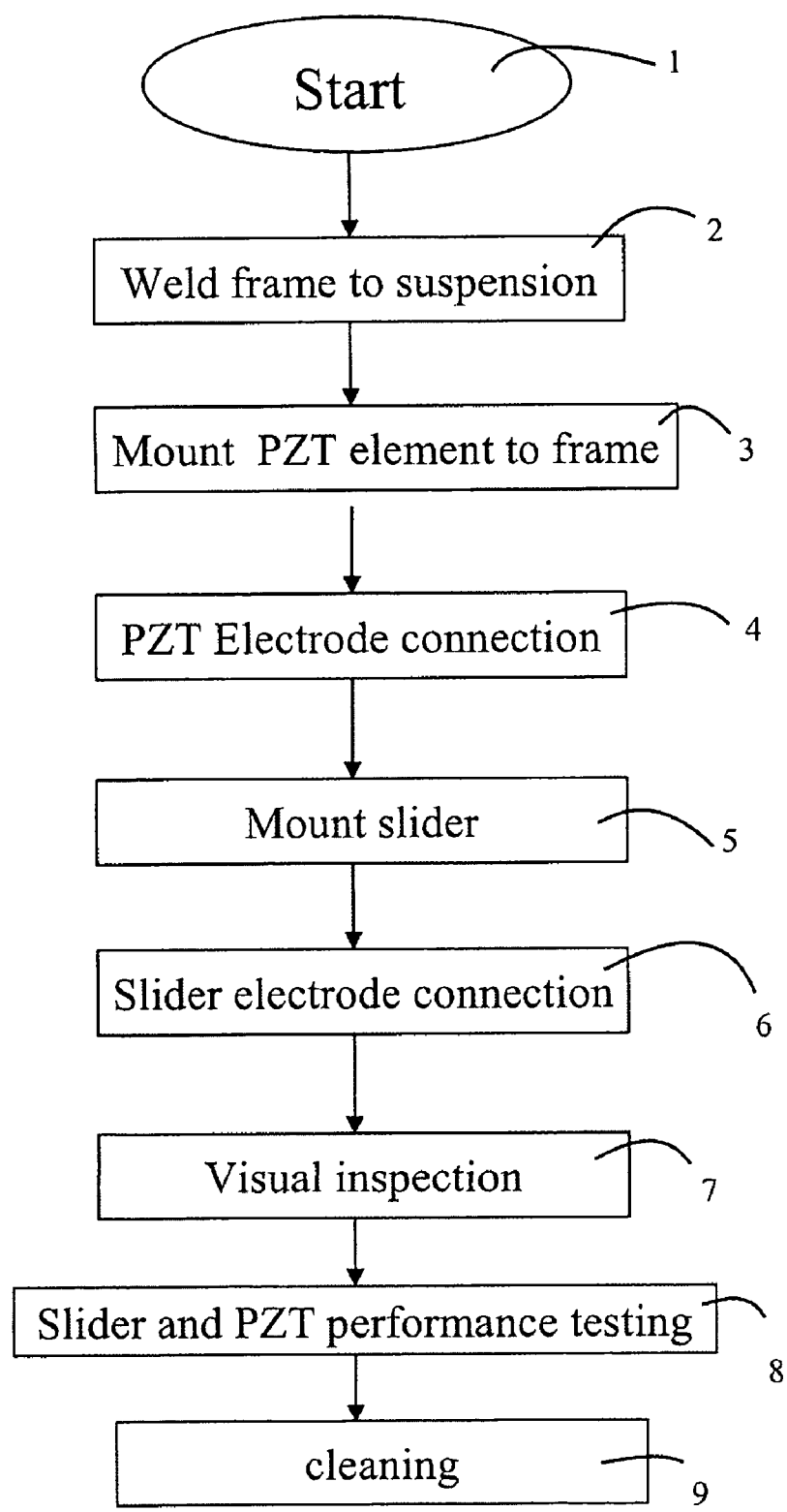
FIG. 22 is a flow chart illustrating a manufacturing process according to another embodiment of the present invention.

FIG. 22 illustrates another exemplary embodiment of a manufacturing process of a head gimbal assembly. After the process starts (step 1 of FIG. 22), the micro-actuator frame is welded, e.g., laser welding, to the suspension tongue of the suspension (step 2 of FIG. 22). The micro-actuator frame may be of the type described above in FIGS. 9-20, and the micro-actuator frame may be welded via a micro-actuator mounting structure of the type described above in FIGS. 9-20. After welding, PZT elements are mounted to side arms of the micro-actuator frame (step 3 of FIG. 22). Next, the PZT elements are electrically connected with suspension traces provided on the suspension (step 4 of FIG. 22). The slider is mounted to the micro-actuator frame (step 5 of FIG. 22), and then the slider is electrically connected with suspension traces provided on the suspension (step 6 of FIG. 22). The head gimbal assembly is visually inspected (step 7 of FIG. 22), and slider and PZT performance testing is conducted (step 8 of FIG. 22). In the final step, the head gimbal assembly is cleaned (step 9 of FIG. 22).

Figure 23:
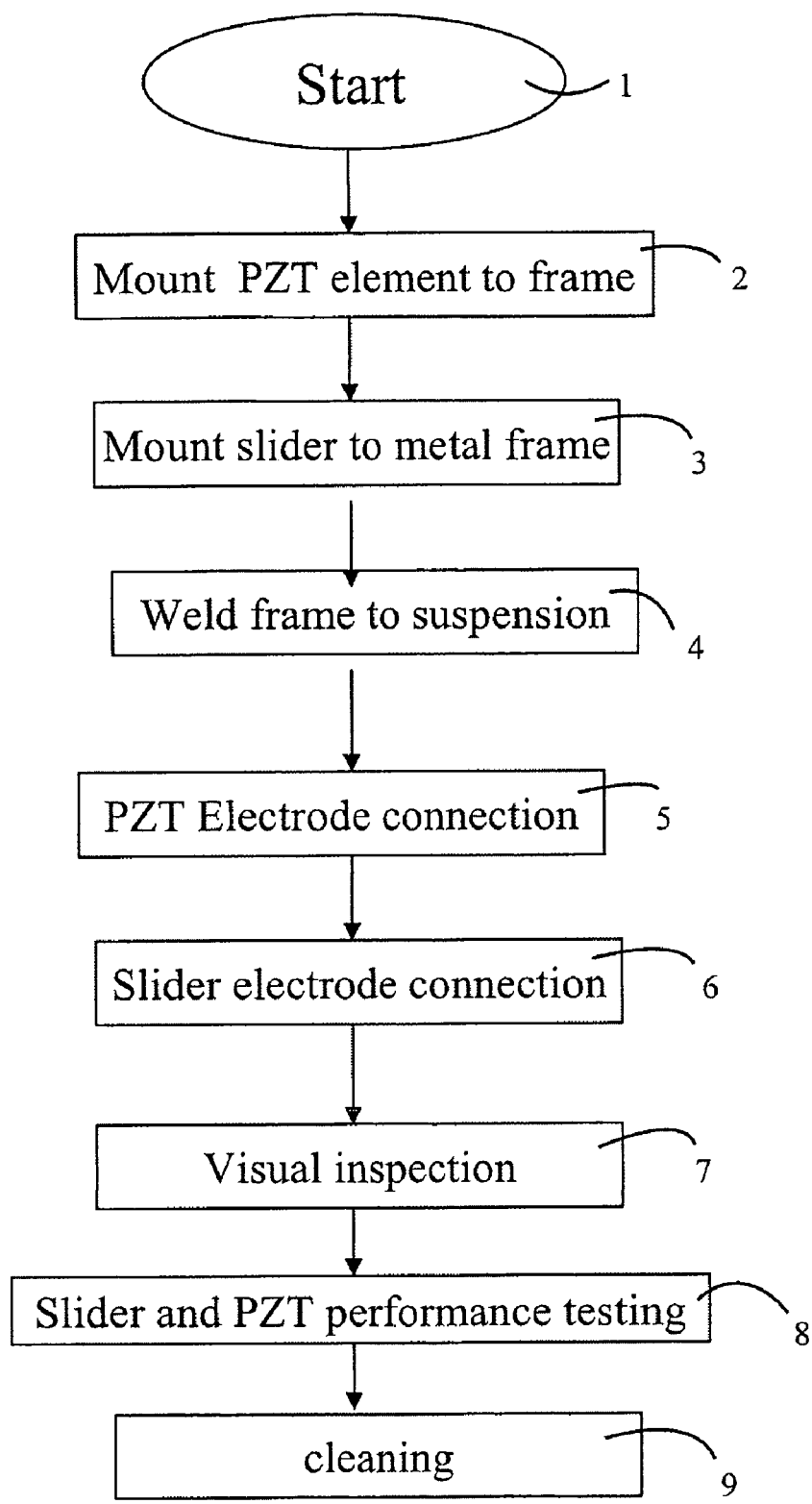
FIG. 23 is a flow chart illustrating a manufacturing process according to another embodiment of the present invention.

FIG. 23 illustrates another exemplary embodiment of a manufacturing process of a head gimbal assembly. After the process starts (step 1 of FIG. 23), PZT elements are mounted to side arms of the micro-actuator frame (step 2 of FIG. 23). The micro-actuator frame may be of the type described above in FIGS. 9-20. Then, the slider is mounted to the micro-actuator frame (step 3 of FIG. 23). Next, the micro-actuator frame is welded, e.g., laser welding, to the suspension tongue of the suspension (step 4 of FIG. 23). The micro-actuator frame may be welded via a micro-actuator mounting structure of the type described above in FIGS. 9-20. After the welding, the PZT elements are electrically connected with suspension traces provided on the suspension (step 5 of FIG. 23), and the slider is electrically connected with suspension traces provided on the suspension (step 6 of FIG. 23). The head gimbal assembly is visually inspected (step 7 of FIG. 23), and slider and PZT performance testing is conducted (step 8 of FIG. 23). In the final step, the head gimbal assembly is cleaned (step 9 of FIG. 23).

FIGS. 24-26 illustrate yet another exemplary embodiment of a manufacturing process of a head gimbal assembly. As shown in FIG. 24, PZT elements 1042 are first mounted to side arms of the micro-actuator frame 1052. The micro-actuator frame 1052 may be of the type described above in FIGS. 9-20. Then, as shown in FIG. 25, the micro-actuator frame 1052 is welded, e.g., laser welding with a plurality of laser dots 1060, to the suspension tongue of the suspension flexure 1024. The micro-actuator frame 1052 may be welded via a micro-actuator mounting structure of the type described above in FIGS. 9-20. Next, the suspension flexure 1024 is coupled, e.g., by welding, to the load beam 1020, hinge 1022, and base plate 1018, as shown in FIG. 26.

Figure 27:
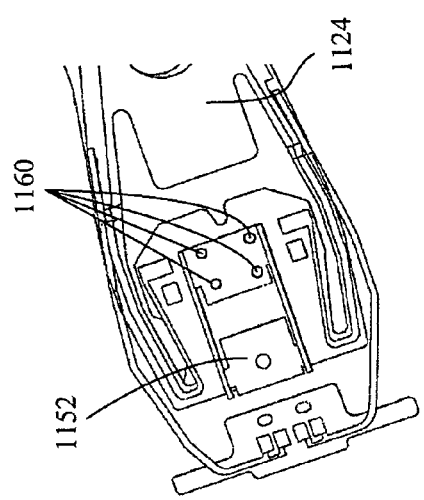
FIGS. 27-30 are sequential views illustrating a manufacturing process according to another embodiment of the present invention.
Figure 28:
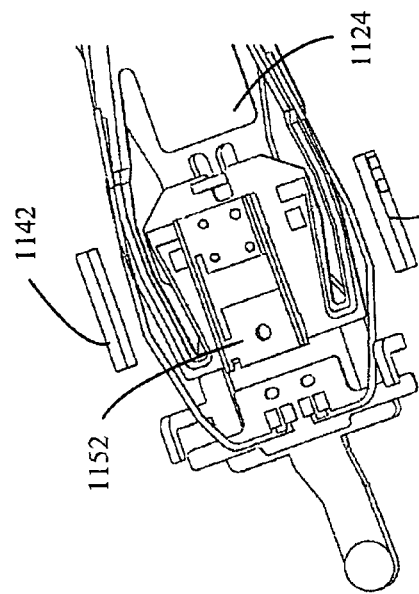
Figure 29:
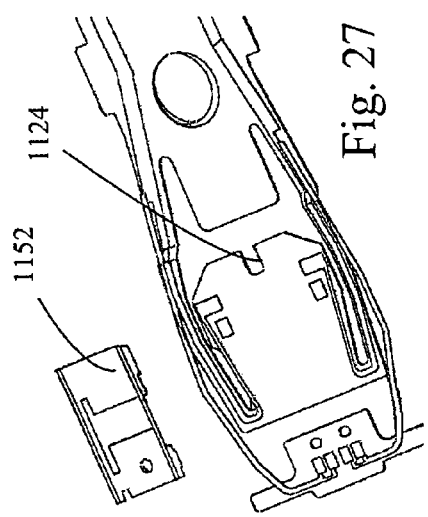
Figure 30:
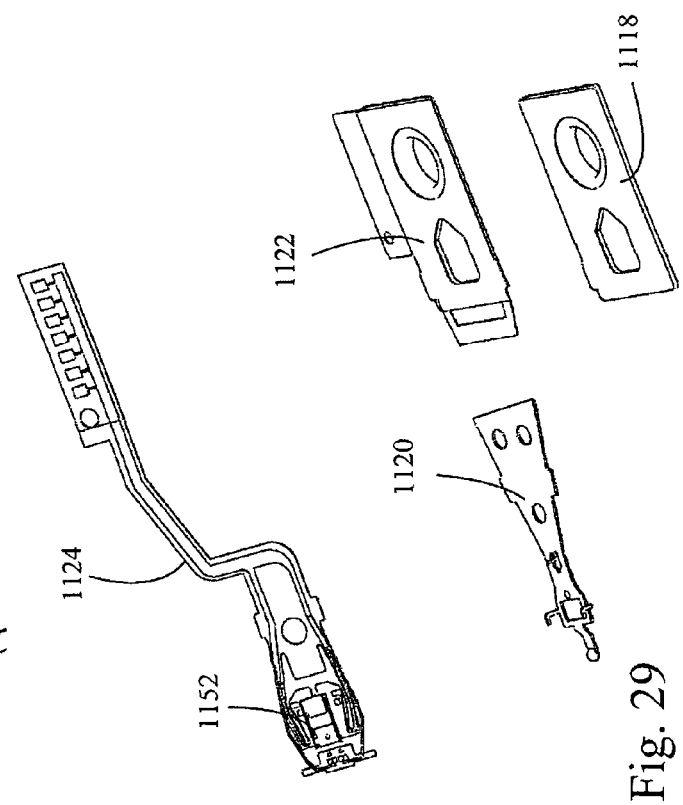

FIGS. 27-30 illustrate still another exemplary embodiment of a manufacturing process of a head gimbal assembly. As shown in FIGS. 27-28, the micro-actuator frame 1152 is first welded, e.g., laser welding with a plurality of laser dots 1160, to the suspension tongue of the suspension flexure 1124. The micro-actuator frame 1152 may be of the type described above in FIGS. 9-20, and the micro-actuator frame 1152 may be welded via a micro-actuator mounting structure of the type described above in FIGS. 9-20. After welding, the suspension flexure 1124 is coupled, e.g., by welding, to the load beam 1120, hinge 1122, and base plate 1118, as shown in FIG. 29. Next, as shown in FIG. 30, PZT elements 1142 are mounted to side arms of the micro-actuator frame 1152.

A head gimbal assembly incorporating micro-actuator mounting arrangements described above in FIGS. 9-20 and/or HGA manufacturing processes described above in FIGS. 21-30 may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The micro-actuator mounting arrangements and/or HGA manufacturing processes described above can be implemented in any suitable disk drive device having a micro-actuator or any other device with a micro-actuator.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator frame for a head gimbal assembly, comprising:
   a bottom support adapted to be connected to a suspension of the head gimbal assembly;
   a top support adapted to support a slider of the head gimbal assembly;
   a pair of side arms that interconnect the bottom support and the top support; and
   a micro-actuator mounting structure provided to the bottom support, the micro-actuator mounting structure comprising a substantially U-shaped bend such that the micro-actuator mounting structure extends in at least one direction that is either parallel or perpendicular to the side arms, the micro-actuator mounting structure constructed and arranged to maintain a substantially constant gap between the top support and the suspension of the head gimbal assembly in use.

2. The micro-actuator frame according to claim 1, further comprising a PZT element mounted to each of the side arms, each PZT element being excitable to cause selective movement of the side arms which causes movement of the top support to cause movement of the slider.

3. The micro-actuator frame according to claim 1, wherein the micro-actuator mounting structure is a metal sheet piece that is provided to a bottom surface of the bottom support.

4. The micro-actuator frame according to claim 1, wherein the micro-actuator mounting structure is a polyimide laminate layer that is provided to a bottom surface of the bottom support.

5. The micro-actuator frame according to claim 1, wherein the micro-actuator mounting structure is integrated into the bottom support.

6. The micro-actuator frame according to claim 5, wherein the micro-actuator mounting structure constitutes the bottom support and includes a stepped configuration.

7. The micro-actuator frame according to claim 5, wherein the micro-actuator mounting structure extends from the bottom support, the micro-actuator mounting structure being bent from an outer end of the bottom support towards a bottom surface of the bottom support to form a parallel gap.

8. The micro-actuator frame according to claim 5, wherein the micro-actuator mounting structure extends from the bottom support, the micro-actuator mounting structure being bent from an inner end of the bottom support towards a bottom surface of the bottom support to form a parallel gap.

9. The micro-actuator frame according to claim 5, wherein the micro-actuator mounting structure extends from the bottom support, the micro-actuator mounting structure including first and second tabs that are bent from opposing sides of the bottom support towards a bottom surface of the bottom support to form respective parallel gaps.

10. The micro-actuator frame according to claim 1, wherein said micro-actuator mounting structure contacts the dimple of the head gimbal assembly indirectly.

11. The micro-actuator frame according to claim 1, wherein said micro-actuator mounting structure is a separate structure that is connected to or extends from the bottom support.

12. A suspension for a head gimbal assembly, comprising:
    a suspension flexure; and
    a micro-actuator mounting structure provided to the suspension flexure and adapted to support a micro-actuator frame, the micro-actuator mounting structure comprising a substantially U-shaped bend such that the micro-actuator mounting structure extends in at least one direction that is either parallel or perpendicular to the suspension flexure, the micro-actuator mounting structure constructed and arranged to maintain a substantially constant gap between a top support of the micro-actuator frame and the suspension flexure in use.

13. The suspension according to claim 12, wherein the micro-actuator mounting structure is a metal sheet piece.

14. The suspension according to claim 12, wherein the micro-actuator mounting structure is a polyimide laminate layer.

15. The suspension according to claim 12, wherein the micro-actuator mounting structure is laminated to the suspension flexure.

16. The micro-actuator frame according to claim 12, wherein said micro-actuator mounting structure contacts the dimple of the head gimbal assembly indirectly.

17. The micro-actuator frame according to claim 12, wherein said micro-actuator mounting structure is a separate structure that is connected to or extends from the bottom support.

18. A head gimbal assembly comprising:
    a suspension;
    a micro-actuator mounted to the suspension by laser welding; and
    a micro-actuator mounting structure provided to one of the suspension and the micro-actuator, the micro-actuator mounting structure extending between the micro-actuator and the suspension to support the micro-actuator on the suspension, the micro-actuator mounting structure comprising a substantially U-shaped bend such that the micro-actuator mounting structure extends in at least one direction that is either parallel or perpendicular to the suspension,
    wherein the micro-actuator mounting structure is constructed and arranged to maintain a substantially constant gap between a top support of the micro-actuator and the suspension in use.

19. The head gimbal assembly according to claim 18, wherein the micro-actuator mounting structure is provided to a suspension tongue of the suspension.

20. The head gimbal assembly according to claim 19, wherein the micro-actuator mounting structure is a metal sheet piece.

21. The head gimbal assembly according to claim 19, wherein the micro-actuator mounting structure is a polyimide laminate layer.

22. The head gimbal assembly according to claim 19, wherein the micro-actuator mounting structure is laminated to the suspension tongue.

23. The head gimbal assembly according to claim 18, wherein the micro-actuator includes a micro-actuator frame including a bottom support adapted to be mounted to the suspension, a top support adapted to support a slider, and a pair of side arms that interconnect the bottom support and the top support, and wherein the micro-actuator mounting structure is provided to the bottom support.

24. The head gimbal assembly according to claim 23, wherein the micro-actuator mounting structure is a metal sheet piece that is provided to a bottom surface of the bottom support.

25. The head gimbal assembly according to claim 23, wherein the micro-actuator mounting structure is a polyimide laminate layer that is provided to a bottom surface of the bottom support.

26. The head gimbal assembly according to claim 23, wherein the micro-actuator mounting structure is integrated into the bottom support.

27. The head gimbal assembly according to claim 26, wherein the micro-actuator mounting structure constitutes the bottom support and includes a stepped configuration.

28. The head gimbal assembly according to claim 26, wherein the micro-actuator mounting structure extends from the bottom support, the micro-actuator mounting structure being bent from an outer end of the bottom support towards a bottom surface of the bottom support to form a parallel gap.

29. The head gimbal assembly according to claim 26, wherein the micro-actuator mounting structure extends from the bottom support, the micro-actuator mounting structure being bent from an inner end of the bottom support towards a bottom surface of the bottom support to form a parallel gap.

30. The head gimbal assembly according to claim 26, wherein the micro-actuator mounting structure extends from the bottom support, the micro-actuator mounting structure including first and second tabs that are bent from opposing sides of the bottom support towards a bottom surface of the bottom support to form respective parallel gaps.

31. The micro-actuator frame according to claim 18, wherein said micro-actuator mounting structure contacts the dimple of the head gimbal assembly indirectly.

32. The micro-actuator frame according to claim 18, wherein said micro-actuator mounting structure is a separate structure that is connected to or extends from the bottom support.

33. A disk drive device comprising:
a head gimbal assembly;
a drive arm connected to the head gimbal assembly;
a disk; and
a spindle motor operable to spin the disk,
wherein the head gimbal assembly includes:
   a suspension;
   a micro-actuator mounted to the suspension by laser welding; and
   a micro-actuator mounting structure provided to one of the suspension and the micro-actuator, the micro-actuator mounting structure extending between the micro-actuator and the suspension to support the micro-actuator on the suspension, the micro-actuator mounting structure comprising a substantially U-shaped bend such that the micro-actuator mounting structure extends in at least one direction that is either parallel or perpendicular to the suspension,
wherein the micro-actuator mounting structure is constructed and arranged to maintain a substantially constant gap between a top support of the micro-actuator and the suspension in use.

34. The micro-actuator frame according to claim 33, wherein said micro-actuator mounting structure contacts the dimple of the head gimbal assembly indirectly.

35. The micro-actuator frame according to claim 33, wherein said micro-actuator mounting structure is a separate structure that is connected to or extends from the bottom support.

* * * * *